United States Patent Office.

N. H. CASS, OF HENRYVILLE, INDIANA.

Letters Patent No. 80,597, dated August 4, 1868.

IMPROVED MEDICAL COMPOUND FOR TREATING HOG-CHOLERA.

*The Schedule referred to in these Letters Patent and making part of the same.*

TO ALL WHOM IT MAY CONCERN:

Be it known that I, N. H. CASS, of Henryville, in the county of Clarke, and State of Indiana, have invented a new and improved Medical Compound; and I do hereby declare that the following is a full, clear, and exact description thereof, which will enable those skilled in the art to make and use the same.

This invention relates to a remedy for the disease known as "hog-cholera," which disease has proved so destructive and fatal in many parts of the western country.

In sections of the country where hogs are produced by the thousand, and where the principal crop, that of corn, is mainly absorbed in feeding and preparing the hog for market, it is of the utmost importance to keep the hog in a healthy condition; and as the disease known as "hog-cholera" has been considered incurable, and proved most destructive, I have been induced to make many experiments, with a view of discovering a remedy, and have succeeded in doing so, after many trials with different medicines and compositions.

In carrying out my invention, I form a compound of the following ingredients, and in about the proportions given, viz:

Cochineal, one ounce.
Linseed-oil cake, two ounces.
Sarsaparilla, three ounces.
Venetian red, four ounces.
Madder, five ounces.
Opium, one ounce.

I claim as new, and desire to secure by Letters Patent—

The compound composed of the above-mentioned ingredients, in about the proportions named, substantially as and for the purposes described.

The above specification of my invention signed by me, this 21st day of May, 1868.

N. H. CASS.

Witnesses:
   C. P. FERGUSON,
   A. J. HAY.